United States Patent
Ikebukuro

(10) Patent No.: US 11,971,093 B2
(45) Date of Patent: Apr. 30, 2024

(54) DRIVE GEAR FOR FISHING REEL

(71) Applicant: Shimano Inc., Osaka (JP)

(72) Inventor: Satoshi Ikebukuro, Osaka (JP)

(73) Assignee: Shimano Inc., Osaka (JP)

( * ) Notice: Subject to any disclaimer, the term of this patent is extended or adjusted under 35 U.S.C. 154(b) by 357 days.

(21) Appl. No.: 17/172,537

(22) Filed: Feb. 10, 2021

(65) Prior Publication Data

US 2021/0317904 A1  Oct. 14, 2021

(30) Foreign Application Priority Data

Apr. 14, 2020 (JP) ................................ 2020-072237

(51) Int. Cl.
*F16H 55/17* (2006.01)
*A01K 89/01* (2006.01)

(52) U.S. Cl.
CPC ............. *F16H 55/17* (2013.01); *A01K 89/01* (2013.01); *F16H 2055/173* (2013.01)

(58) Field of Classification Search
CPC .... F16H 55/17; F16H 2055/173; A01K 89/01
See application file for complete search history.

(56) References Cited

U.S. PATENT DOCUMENTS

2004/0021022 A1* 2/2004 Amano .................. A01K 89/01
242/249

FOREIGN PATENT DOCUMENTS

| DE | 10 2005 024 455 B4 | 3/2007 | |
|---|---|---|---|
| DE | 10 2007 054 764 A1 | 5/2009 | |
| EP | 2 443 921 A2 | 4/2012 | |
| EP | 2443921 A2 * | 4/2012 | ............ A01K 89/01 |
| EP | 2 711 590 A1 | 3/2014 | |
| JP | 2017-61982 A | 3/2017 | |
| JP | 6202796 B2 | 9/2017 | |

OTHER PUBLICATIONS

Machine Translation of EP 2443921 A2 Pdf file name: "EP2443921A2_Machine_Translation.pdf".*

* cited by examiner

*Primary Examiner* — Grant Moubry
*Assistant Examiner* — Ruben Picon-Feliciano
(74) *Attorney, Agent, or Firm* — Global IP Counselors, LLP

(57) ABSTRACT

A drive gear used for a fishing reel includes a disc portion having a rotational axis, and a gear tooth protruding from a side surface on an outer peripheral side of the disc portion in a direction in which the rotational axis extends. The gear tooth has a body part and an extended part extending radially inward from the body part. A first angle formed by a cylindrical surface around the rotational axis passing through an axially-outer surface of the body part and a radially-inner surface of the extended part is larger than a meshing pressure angle.

7 Claims, 10 Drawing Sheets

DRIVE GEAR FOR FISHING REEL

CROSS-REFERENCE TO RELATED APPLICATIONS

This application claims priority to Japanese Patent Application No 2020-072237, filed on Apr. 14, 2020. The entire disclosure of Japanese Patent Application No. 2020-072237 is hereby incorporated herein by reference.

BACKGROUND

Field of the Invention

The present invention relates to a drive gear for a fishing reel.

Background Art

Conventional drive gears include a plurality of gear teeth. Each conventional gear tooth has a pair of tooth surfaces, and each tooth surface meshes with a pinion gear. A meshing direction line L1 and a plurality of meshing simultaneous contact lines L2 intersecting with the meshing direction line L1 are defined on each of the tooth surfaces (See FIG. 9 of the present specification).

Here, the meshing direction line L1 is a line formed by connecting the positions where contact with the tooth surface is at the highest point on each of the plurality of meshing simultaneous contact lines L2. Each of the plurality of meshing simultaneous contact lines L2 are the lines at which the pinion gear makes contact with the tooth surface of the drive gear.

SUMMARY

In a conventional drive gear, the meshing direction line L1 extends from a base end at the outer peripheral side of a gear tooth towards a tooth tip at the inner peripheral side of the gear tooth.

When a pinion gear meshes with the tooth tip at the inner peripheral side of the gear tooth under this condition, in other words, when the pinion gear meshes with a corner section QR at the inner peripheral side of a tooth surface, where the meshing simultaneous contact line L2 is short, a stress concentration arises on the tooth tip (the corner section QR in FIG. 9) at the inner peripheral side of the gear tooth of the drive gear.

it has been determined that in this situation, a bending moment applied to a base end portion of the gear tooth is large and the gear tooth may be deformed. This can prevent the drive gear from rotating smoothly. Additionally, if the drive gear cannot rotate smoothly, abnormal noise can occur when the drive gear rotates while meshing with the pinion gear.

The present invention has been made in view of the above-mentioned problems and the purpose of the disclosure is to provide a drive gear for a fishing reel, capable of improving the rotational sensation. Additionally, the purpose of the disclosure is to provide a drive gear for a fishing reel, capable of suppressing the occurrence of abnormal noise that is generated while rotating.

One aspect of the present disclosure is to provide a drive gear used in a fishing reel. The drive gear of the fishing reel includes a disc portion and a plurality of gear teeth. The disc portion has a rotational axis. The plurality of the gear teeth respectively protrude from a side surface on the outer peripheral side of the disc portion in the direction in which the rotational axis extends.

Each gear tooth has a body part and an extended part extending radially inward from the body part. A first angle formed by an axially-outer surface of the body part and a radially-inner surface of the extended part is larger than a meshing pressure angle.

In this embodiment of a drive gear, on the gear tooth, the extended part extends radially inwardly from the body part. Here, the first angle is larger than the meshing pressure angle. In this way, by forming the extended part on the gear tooth and making the first angle larger than the meshing pressure angle, the stress generated at a corner section on the inner peripheral side of a tooth tip of the gear tooth can be smaller than that in the conventional technology. In this way, the rotational sensation of the drive gear can be improved. Additionally, by improving the rotational sensation of the drive gear, the occurrence of abnormal noise that is generated when the drive gear rotates can be suppressed.

In a drive gear for a fishing reel according to another aspect of the present disclosure, a first angle is larger than a second angle formed by an axially-outer surface of a body part and a radially-outer surface of the body part.

In this embodiment, since the first angle is larger than the second angle, it is possible to suitably improve the rotational sensation of the drive gear. Additionally, it is possible to suitably suppress the occurrence of abnormal noise that is generated when the drive gear rotates.

In a drive gear for a fishing reel according to another aspect of the present disclosure, a pair of tooth surfaces are formed on a body part and an extended part and are spaced apart in the circumferential direction. Each of the tooth surfaces includes a first edge extending in the tooth trace direction on the base end side of a gear tooth and a second edge extending in the tooth trace direction on the tip side of the gear tooth. The first edge is longer than the second edge.

In this embodiment, since the first edge is longer than the second edge, it is possible to suppress the deformation of the gear tooth. As such, it is possible to suitably improve the rotational sensation of the drive gear. Additionally, it is possible to suitably suppress the occurrence of abnormal noise that is generated when the drive gear rotates.

In a drive gear for a fishing reel according to another aspect of the present disclosure, the ratio of a first edge to a second edge is 1.28 or more. As such, it is possible to suitably improve the rotational sensation of the drive gear. Additionally, it is possible to suitably suppress the occurrence of abnormal noise that is generated when the drive gear rotates.

In a drive gear for a fishing reel according to another aspect of the present disclosure, a tooth surface further includes a third edge connecting a first edge and a second edge on the radially inside of a gear tooth and a fourth edge connecting the first edge and the second edge on the radially outside of the gear tooth. The third edge is longer than the fourth edge.

In this embodiment, by making the third edge longer than the fourth edge, a simultaneous meshing contact line on a corner section on the inner peripheral side of a tooth tip of the gear tooth can be longer than that of the conventional technology. As such, it is possible to suitably improve the rotational sensation of the drive gear. Additionally, it is possible to suitably suppress the occurrence of abnormal noise that is generated when the drive gear rotates.

In a drive gear for a fishing reel according to another aspect of the present disclosure, the ratio of a third edge to a fourth edge is 1.10 or more. In this way, it is possible to suitably improve the rotational sensation of the drive gear. Additionally, it is possible to suitably suppress the occurrence of abnormal noise that is generated when the drive gear rotates.

A drive gear for a fishing reel according to another aspect of the present disclosure includes a reel body, a handle rotatably supported by the reel body and the above-mentioned drive gear which rotates by the rotation of the handle. With this fishing reel, it is possible to obtain the same effect as the above-mentioned drive gear.

In the embodiments of the present invention, it is possible to improve the rotational sensation of a drive gear of a fishing reel. Also, the occurrence of abnormal noise that is generated when the drive gear of the fishing reel rotates can be suppressed.

DETAILED DESCRIPTION OF EMBODIMENTS

Figure 1:
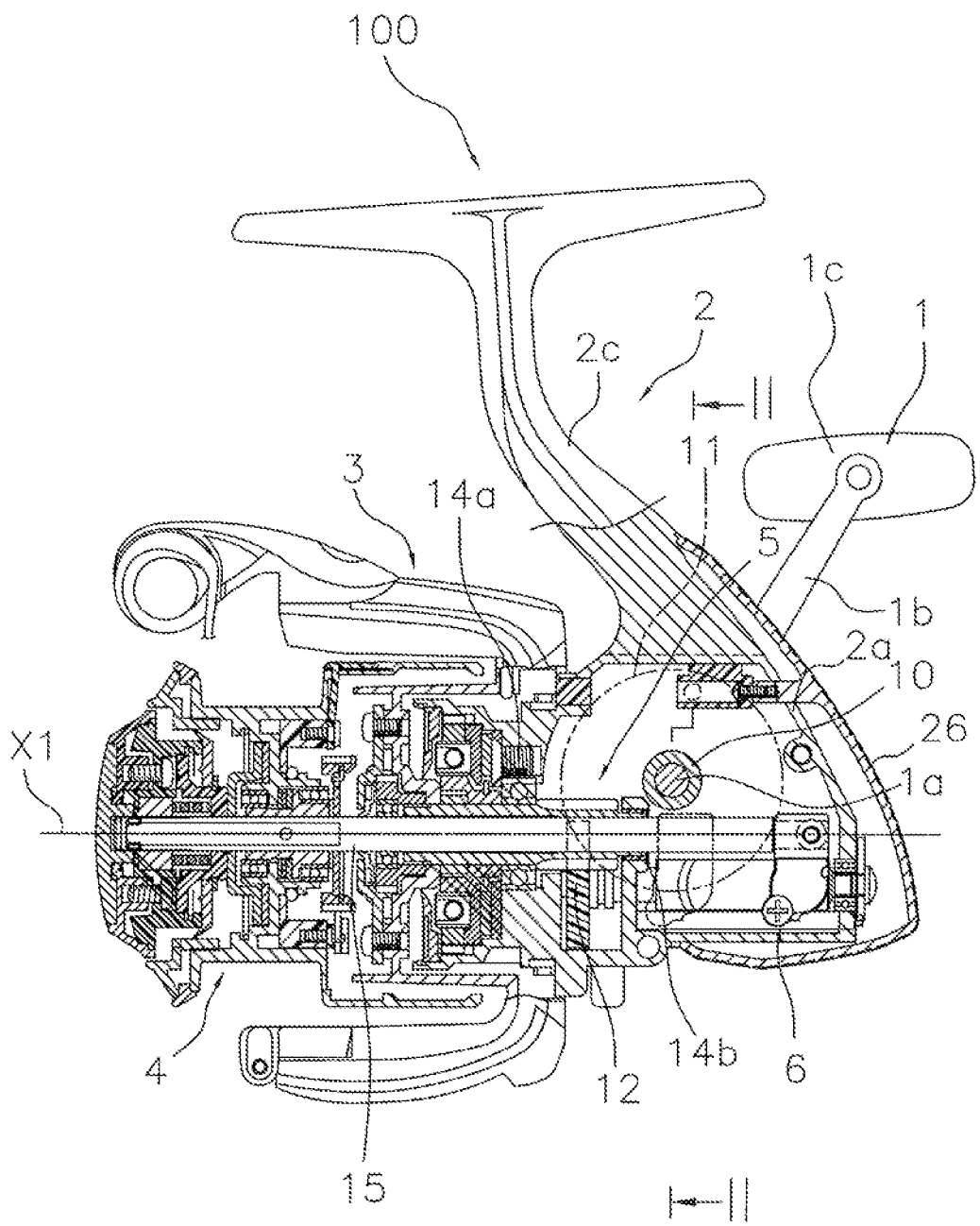
FIG. 1 is a cross-sectional view of a spinning reel according to an embodiment of the present invention.

A spinning reel 100 (one example of a fishing reel) according to an embodiment of the present invention, as shown in FIG. 1, includes a handle 1, a reel main body 2 which supports the handle 1 rotatably, a rotor 3 and a spool 4. The rotor 3 is rotatably supported on the front part of the reel main body 2.

The handle 1 includes a handle shaft 1a, a handle arm 1b and a handle grip 1c. A drive shaft 10 is integrally and rotatably connected to the handle shaft 1a. The handle arm 1b is operatively connected to the handle shaft 1a, and the handle grip 1c is operatively connected to the handle arm 1b. The handle 1 can be attached to either of the left or right side of the reel main body 2.

A fishing line can be wound around the outer peripheral surface of the spool 4. The spool 4 is arranged on the front part of the rotor 3 so as to be freely movable back and forth. The spool 4 is attached to the tip of a spool shaft 15. The spool shaft 15 has a spool shaft center X1. The rotor 3 is integrally and rotatably connected to a pinion gear 12. The rotor 3 is rotatably supported with respect to the reel main body 2.

Configuration of Reel Main Body

As shown in FIG. 1, the reel main body 2 includes a reel body 2a with a storage space inside thereof, that opens on the side and a lid member 2b (FIG. 2) detachably attached to the reel body 2a to close the storage space of the reel body 2a. Additionally, the reel main body 2 includes a body guard 26 which covers the back sides of the reel body 2a and the lid member 2b.

A rod-attaching leg 2c is integrally formed on the reel body 2a. A rotor drive mechanism 5 and an oscillating mechanism 6 are disposed inside of the reel body 2a. The oscillating mechanism 6 is a mechanism for moving the spool shaft 15 in the front-rear direction. By operating the oscillating mechanism 6, the spool 4 moves in the front-rear direction. The configuration of the oscillating mechanism 6 is substantially the same as that of the prior art, and thus, the description thereof will be omitted here.

Configuration of Rotor Drive Mechanism

Figure 2:
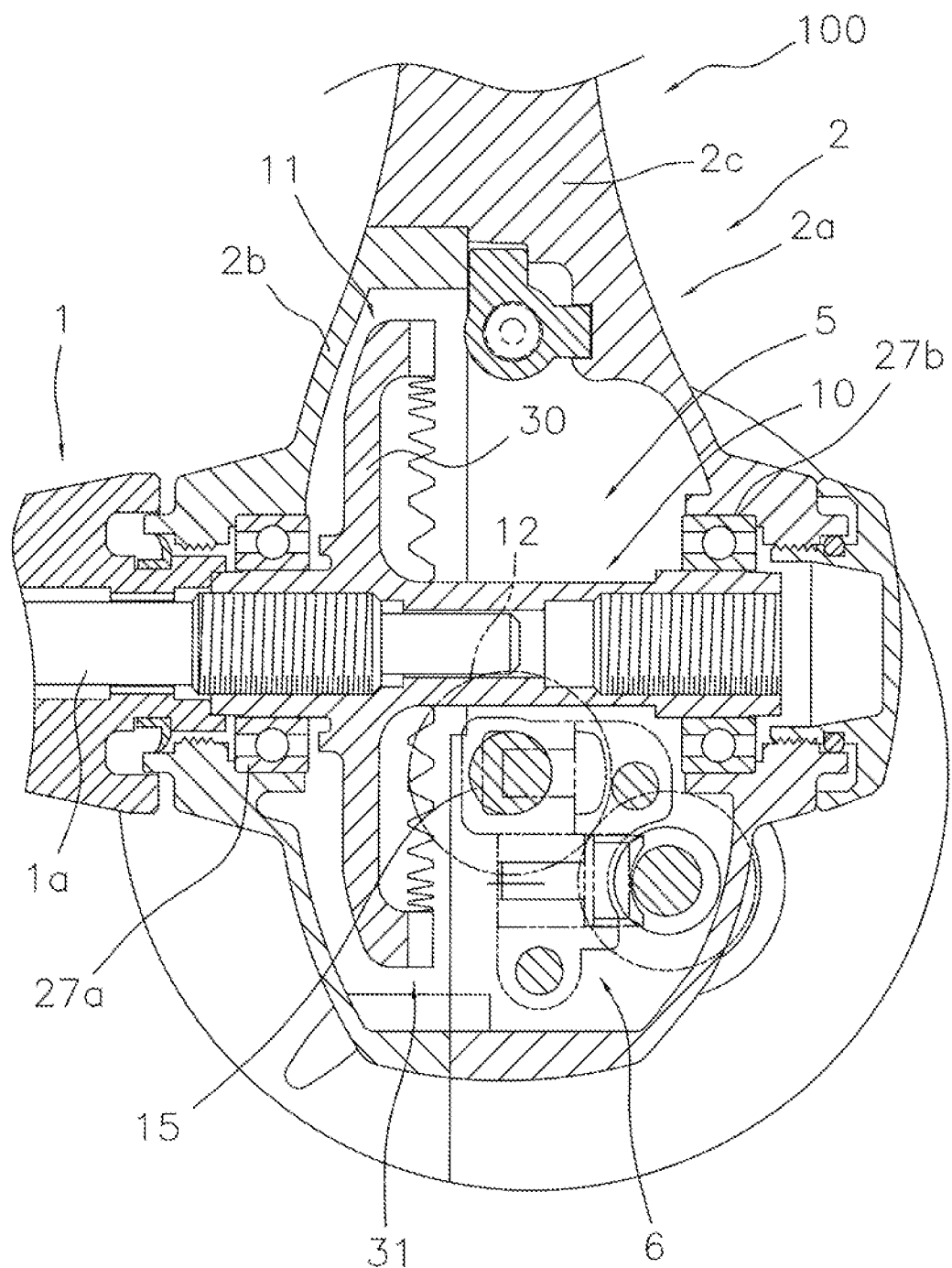
FIG. 2 is a cross-sectional view of the spinning reel, taken along line II in FIG. 1.
Figure 3:
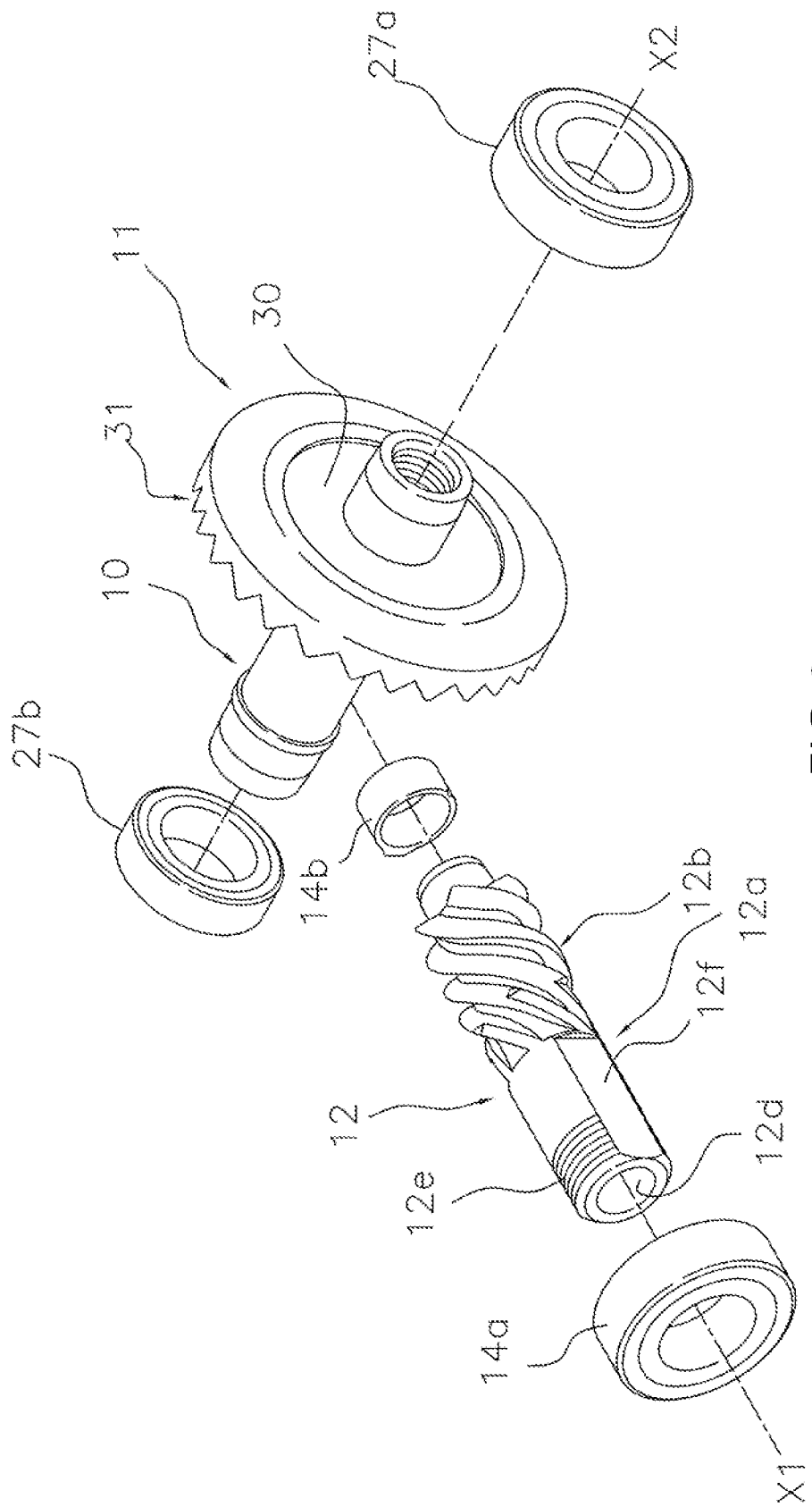
FIG. 3 is a disassembled oblique view of a rotor drive mechanism.

The rotor drive mechanism 5 transmits the rotation of the handle 1 to the rotor 3. As shown in FIGS. 2 and 3, the rotor drive mechanism 5 includes a drive gear 11 and the pinion gear 12. The drive gear 11 integrally rotates with the drive shaft 10. The pinion gear 12 meshes with the drive gear 11.

As shown in FIG. 3, the pinion gear 12 includes a cylindrical gear body 12a and a gear portion 12b. The gear body 12a is arranged on the reel body 2a so as to be inconsistent with the handle shaft 1a. In detail, the gear body 12a is arranged on the reel body 2a so as to be inconsistent (or transverse) with the rotational axis X2 of the drive gear 11.

The gear body 12a is rotatably supported on the reel body 2a. For example, the gear body 12a is rotatably supported on the reel body 2a by a bearing 14a and a bearing 14b. A through hole 12d through which the spool shaft 15 can be inserted is formed on the gear body 12a.

A male screw portion 12e and a rotation preventing plane 12f are formed on the gear body 12a. By engaging the male screw portion 12e and the rotation preventing plane 12f with the rotor 3, the gear body 12a is integrally and rotatably connected to the rotor 3. The gear portion 12b is formed on the gear body 12a.

As shown in FIG. 2, the drive gear 11 is integrally formed with the drive shaft 10. The drive gear 11 can be formed separately from the drive shaft 10. The drive shaft 10 integrally rotates with the handle shaft 1a by a screw connection. The drive shaft 10 can be integrally rotatable with the handle shaft 1a by non-circular engagement. The drive shaft 10 is rotatably attached to the reel main body 2 by a bearing 27a attached to the lid member 2b and a bearing 27b attached to the reel body 2a.

Figure 4:
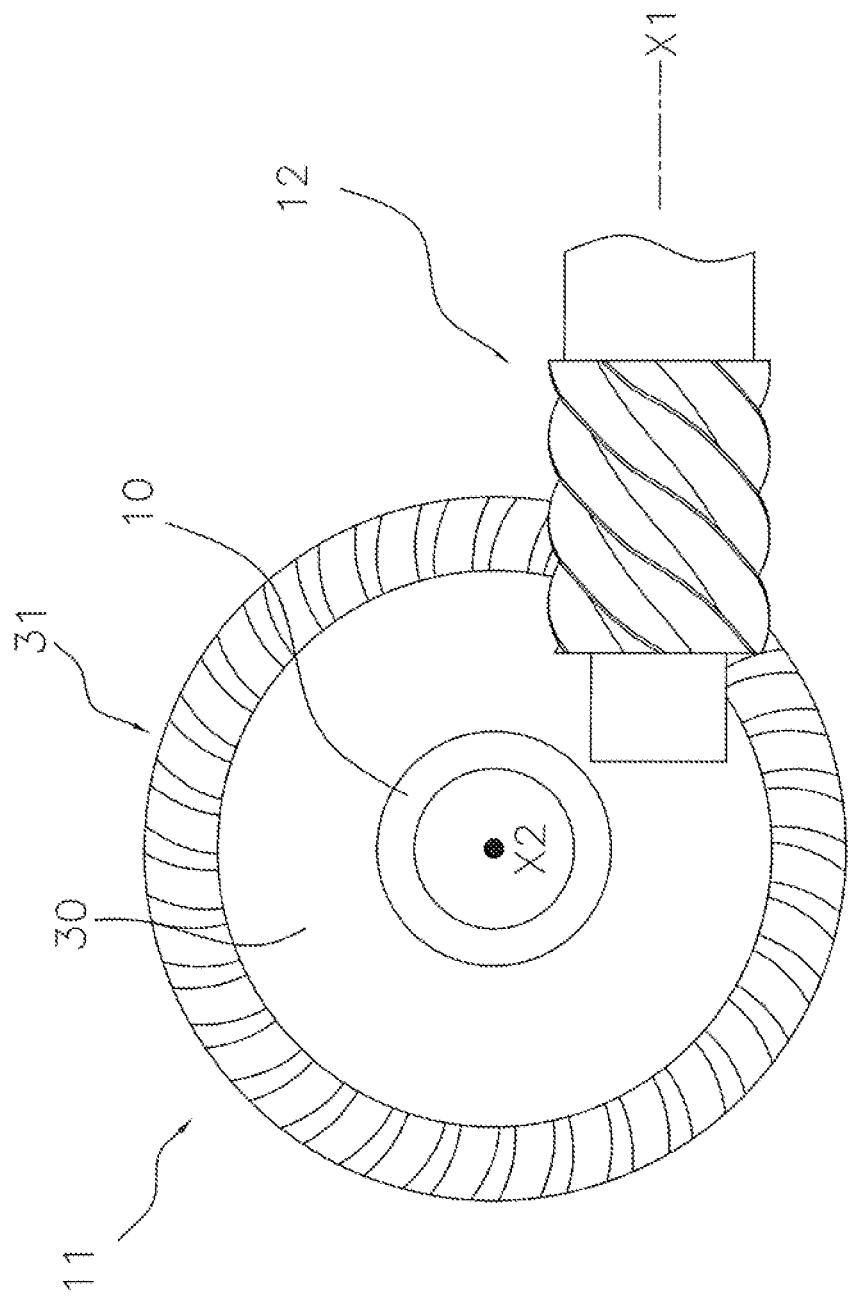
FIG. 4 is a plan view of the rotor drive mechanism.

In this embodiment, as shown in FIGS. 2, 3 and 4, the drive gear 11 is a face gear. The drive gear 11 includes a disc portion 30 and a plurality of gear teeth 31. The disc portion 30 has a rotational axis X2, and is formed in a circular plate shape. The disc portion 30 is preferably formed integrally with the drive shaft 10; however, the disc portion 30 can be formed separately from the drive shaft 10.

As shown in FIGS. 2 and 3, the plurality of gear teeth 31 respectively protrude from a side surface on the outer peripheral side of the disc portion 30 in the direction in which the rotational axis X2 extends. For example, the plurality of gear teeth 31 are formed integrally on the side surface on the outer peripheral side of the disc portion 30. The plurality of gear teeth 31 are formed on one side surface on the outer peripheral side of the disc portion 30 at predetermined intervals in the circumferential direction. The circumferential direction is the direction around the rotational axis X2 using the rotational axis X2 as a reference.

Figure 5:
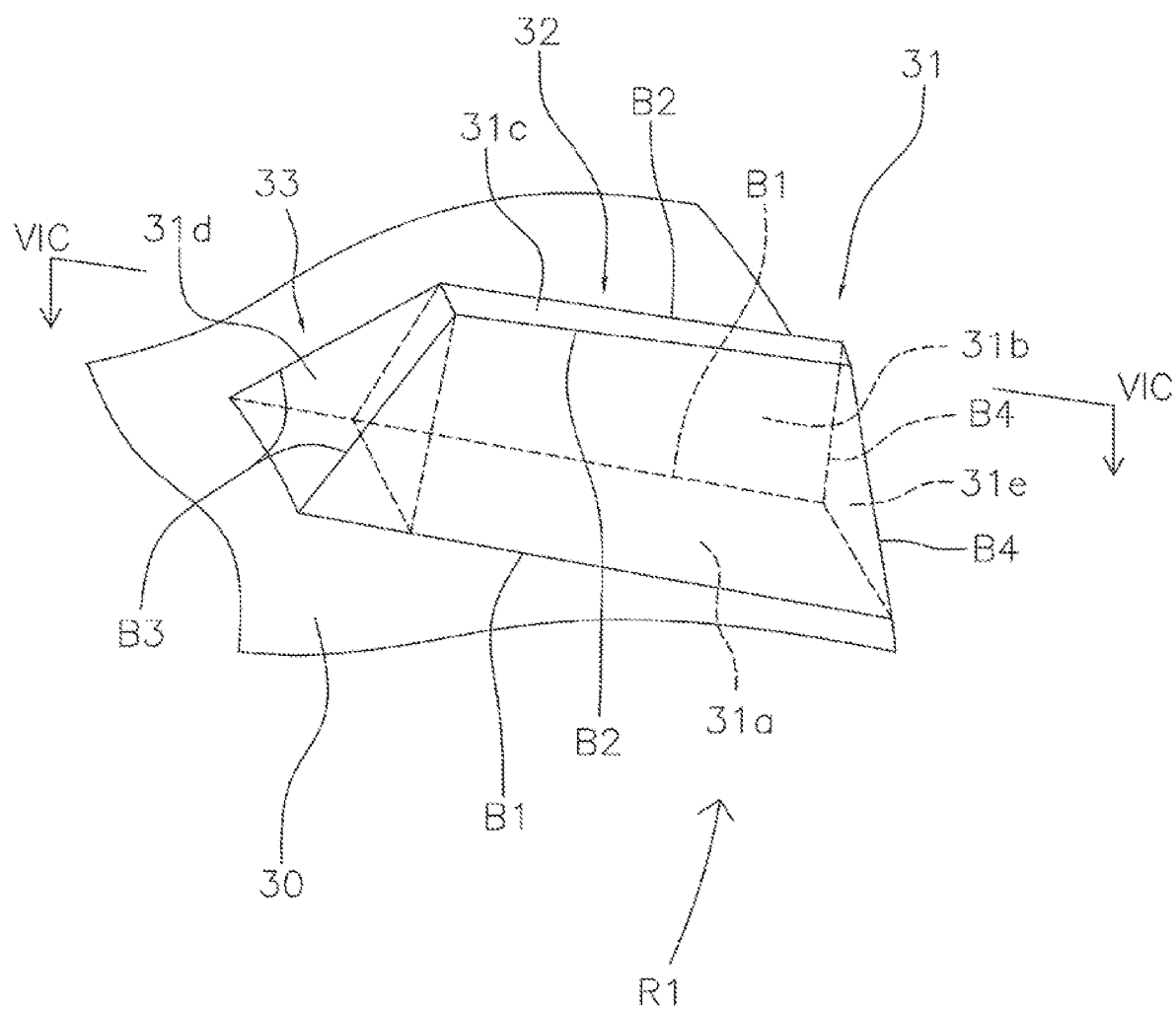
FIG. 5 is a perspective view of a gear tooth of a drive gear.

As shown in FIG. 5, each gear tooth 31 has a body part 32 and an extended part 33. The body part 32 forms the radially outward portion of the gear tooth 31. In one embodiment, the body part 32 forms the radially center section and the radially outward portion. The body part 32 has a tooth tip surface 31c (one example of axially-outer surface) and a radially-outer surface 31e. The body part 32 forms a part of a first side surface 31a and a part of a second side surface 31b.

As shown in FIG. 5, the extended portion 33 is the portion that extends radially inward from the body part 32. That is, the extended portion 33 forms a radially inward portion of the gear tooth 31. The extended part 33 has a radially-inner surface 31d. The extended part 33 forms a part of the first side surface 31a and a part of the second side surface 31b. The first side surface 31a and the second side surface 31b form a pair of side surfaces of the body part 31 and a pair of side surfaces of the extended part 33.

Meanwhile, in FIG. 5, the boundary between the extended part 33 and the body part 32 is shown by broken lines. The planer surface shown by the broken lines is perpendicular to the disc portion 30. This planer surface passes through the corner section of the tooth tip surface 31c and the radially-inner surface 31d. In FIGS. 6B and 6C described later, the broken lines have the same configuration.

Each gear tooth 31 has the first side surface 31a, the second side surface 31b, the tooth tip surface 31c, the radially-inner surface 31d and the radially-outer surface 31e. The first side surface 31a and the second side surface 31b is one example of a pair of tooth surfaces.

The first side surface 31a is a tooth surface which meshes with the pinion gear 12 when the handle 1 rotates in the line-winding direction. The second side surface 31b is a tooth surface which meshes with the pinion gear 12 when the handle 1 rotates in the line-delivery direction.

The first side surface 31a and the second side surface 31b form a pair of side surfaces of the gear tooth 31. For example, the first side surface 31a and the second side surface 31b form a pair of side surfaces of the body part 32 and the extended part 33. The first side surface 31a and the second side surface 31b are formed on the body part 32 and the extended part 33 and are spaced apart in the circumferential direction. The first side surface 31a and the second side surface 31b have a first edge B1 and a second edge B2, respectively.

The first edge B1 of the first side surface 31a extends in the tooth trace direction on the base end side of the gear tooth 31. The first edge B1 of the first side surface 31a is formed by a corner section of the first side surface 31a and a side surface of the disc portion 30.

The second edge B2 of the first side surface 31a extends in the tooth trace direction on the tip side of the gear tooth 31. The second edge B2 of the first side surface 31a is formed by a corner section of the first side surface 31a and the tooth tip surface 31c.

The first edge B1 of the second side surface 31b extends in the tooth trace direction on the base end side of the gear tooth 31. The first edge B1 of the second side surface 31b is formed by a corner section of the second side surface 31b and the side surface of the disc portion 30. The first edge B1 of the second side surface 31b is arranged to be spaced from the first edge B1 of the first side surface 31a in a circumferential direction.

The second edge B2 of the second side surface 31b extends in the tooth trace direction on the tip side of the gear tooth 31. The second edge B2 of the second side surface 31b is formed by a corner section of the second side surface 31b and the tooth tip surface 31c. The second edge B2 of the second side surface 31b is arranged to be spaced from the second edge B2 of the first side surface 31a in a circumferential direction. It is possible to construe as the second edge B2 of the first side surface 31a and the second edge B2 of the second side surface 31b are also included in the tooth tip surface 31c.

The first side surface 31a and the second side surface 31b further include third edges B3 and fourth edges B4. The third edge B3 of the first side surface 31a is connected to the first edge B1 of the first side surface 31a and the second edge B2 of the first side surface 31a on the radially inside of the gear tooth 31. The third edge B3 of the first side surface 31a is formed by a corner section of the first side surface 31a and the radially-inner surface 31d.

The fourth edge B4 of the first side surface 31a is connected to the first edge B1 of the first side surface 31a and the second edge B2 of the first side surface 31a on the radially outside of the gear tooth 31. The fourth edge B4 of the first side surface 31a is formed by a corner section of the first side surface 31a and the radially-outer surface 31e.

The third edge B3 of the second surface 31b is connected to the first edge B1 of the second surface 31b and the second edge B2 of the second surface 31b on the radially inside of the gear tooth 31. The third edge B3 of the second side surface 31b is formed by a corner section of the second side surface 31b and the radially-inner surface 31d.

The third edge B3 of the second side surface 31b is arranged to be spaced from the third edge B3 of the first side surface 31a in a circumferential direction. It is possible to construe the third edge B3 of the first side surface 31a and the third edge B3 of the second side surface 31b as also included in the radially-inner surface 31d.

The fourth edge B4 of the second side surface 31b is connected to the first edge B1 of the second side surface 31b and the second edge B2 of the second side surface 31b on the radially outside of the gear tooth 31. The fourth edge B4 of the second side surface 31b is formed by a corner section of the second side surface 31b and the radially-outer surface 31e.

The fourth edge B4 of the second side surface 31b is arranged to be spaced from the fourth edge B4 of the first side surface 31a in a circumferential direction. It is possible to construe the fourth edge B4 of the first side surface 31a and the fourth edge B4 of the second side surface 31b as also included in the radially-outer surface 31e.

The tooth tip surface 31c forms a tip surface of the gear tooth 31. For example, the tooth tip surface forms a tip surface of the body part 32. The tooth tip surface 31c is connected to the radially-inner surface 31d and the radially-outer surface 31e. The tooth tip surface 31c is connected to the first side surface 31a and the second side surface 31b. In detail, the tooth tip surface 31c forms an external surface of the gear tooth 31 (the body part 32) between the second edge B2 of the first side surface 31a and the second edge B2 of the second side surface 31b.

The radially-inner surface 31d forms an external surface of the gear tooth 31 on the side closer to the rotational axis X. For example, the radially-inner surface 31d forms an external surface on the radially inner side of the extended part 33. The radially-inner surface 31d is connected to the tooth tip surface 31c and the side surface of the disc portion 30. The radially-inner surface 31d is connected to the first side surface 31a and the second side surface 31b. In one embodiment, the radially-inner surface 31d forms an external surface of the gear tooth 31 (the extended part 33)

between the third edge B3 of the first side surface 31a and the third edge B3 of the second side surface 31b.

The radially-outer surface 31e forms an external surface of the gear tooth 31 on the side apart from the rotational axis X2. For example, the radially-outer surface 31e forms an external surface on the radially outer side of the body part 32. The radially-outer surface 31e is connected to the tooth tip surface 31c and the disc portion 30. The radially-outer surface 31e is connected to the first side surface 31a and the second side surface 31b. In one embodiment, the radially-outer surface 31e forms an external surface of the gear tooth 31 (the body part 32) between the fourth edge B4 of the first side surface 31a and the fourth edge B4 of the second side surface 31b.

Each gear tooth 31 with the above configuration is configured as follows. The FIGS. 6A and 6B are the views when each gear tooth 31 is viewed from the outside in the circumferential direction R1 (See FIG. 5).

Figure 6A:
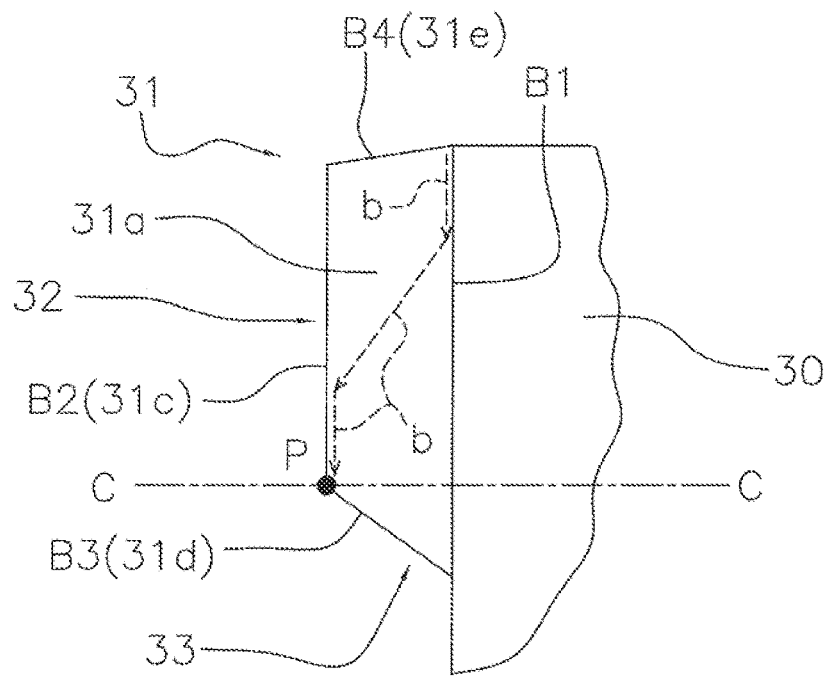
FIG. 6A is a side view of the gear tooth of the drive gear.
Figure 6B:
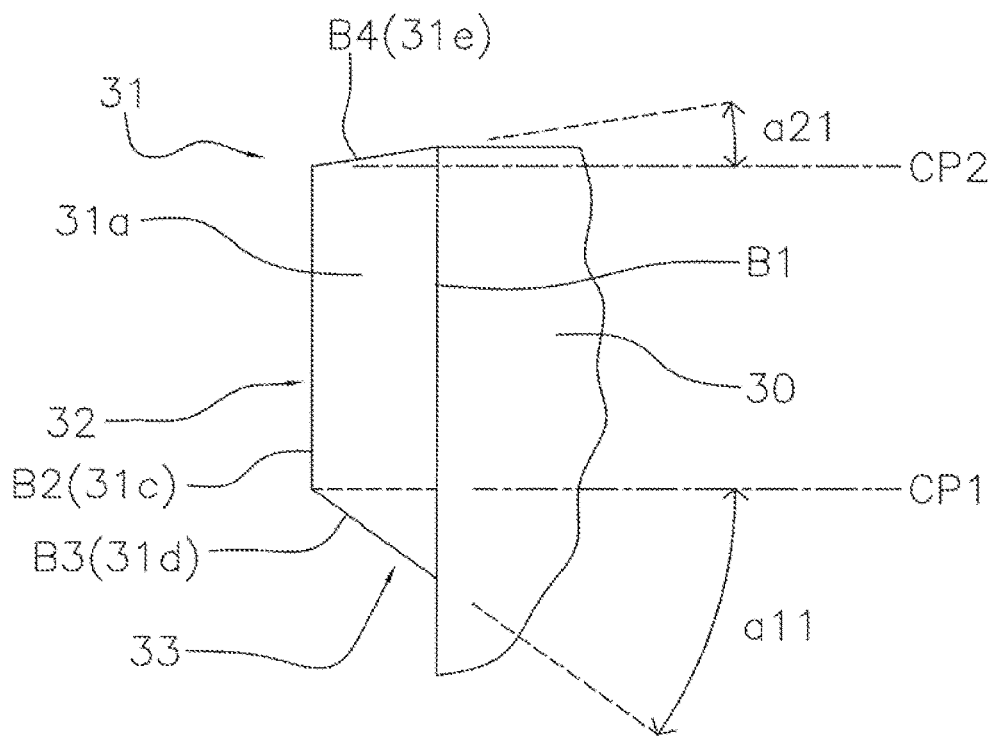
FIG. 6B is a side view of the gear tooth of the drive gear.
Figure 6C:
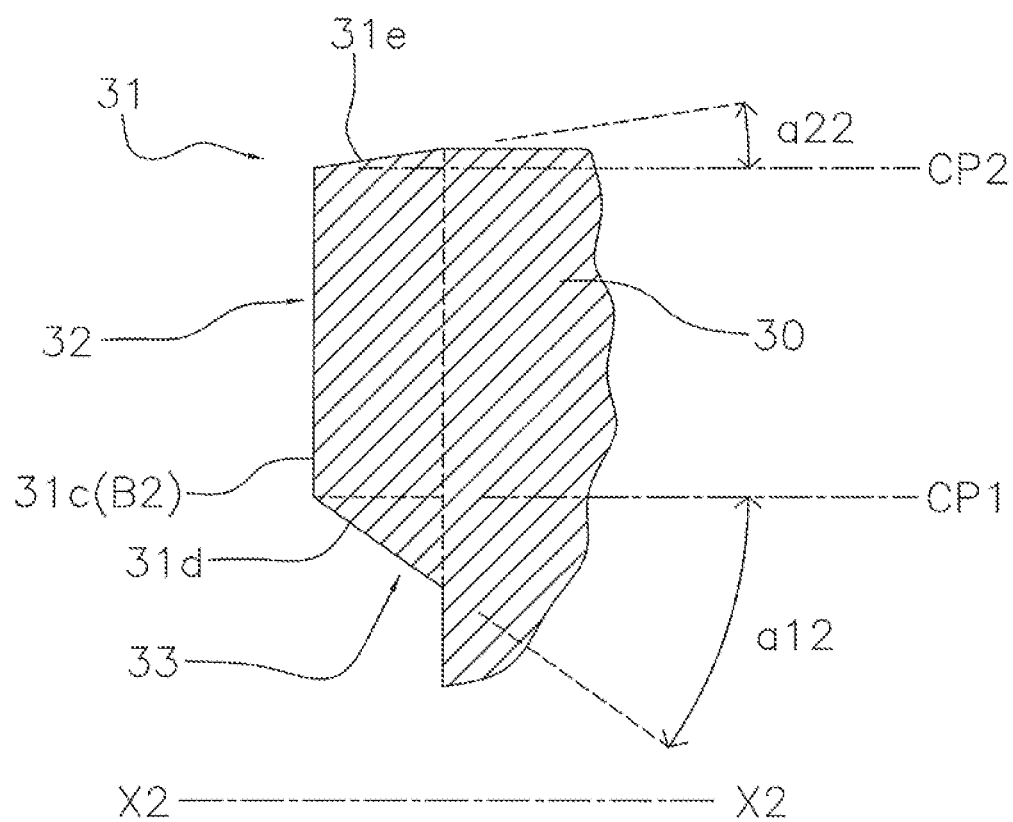
FIG. 6C is a cross-sectional view of the gear tooth of the drive gear, taken along line VIC in FIG. 5.

As shown by the broken line arrow in FIG. 6A, the meshing pressure angle b gradually decreases from the radially outer side to the radially inner side. For example, the meshing pressure angle b gradually decreases from the radially outer side to the radially inner side along the first edge B1, from the first edge B1 to the second edge B2, and along the second edge B2 towards radially inner side.

In FIG. 6A, a meshing end point is indicated by a reference sign P. Here, the point of intersection of the second edge B2 and the third edge B3 is the meshing end point P. The meshing end point P is the point where the meshing pressure angle b is the smallest. In FIG. 6A, a planar surface C passing through the meshing end point P is defined. The planar surface C is perpendicular to the side surface of the disc portion 30 and passes through the meshing end point P and extends in the circumferential direction R1.

Figure 7:
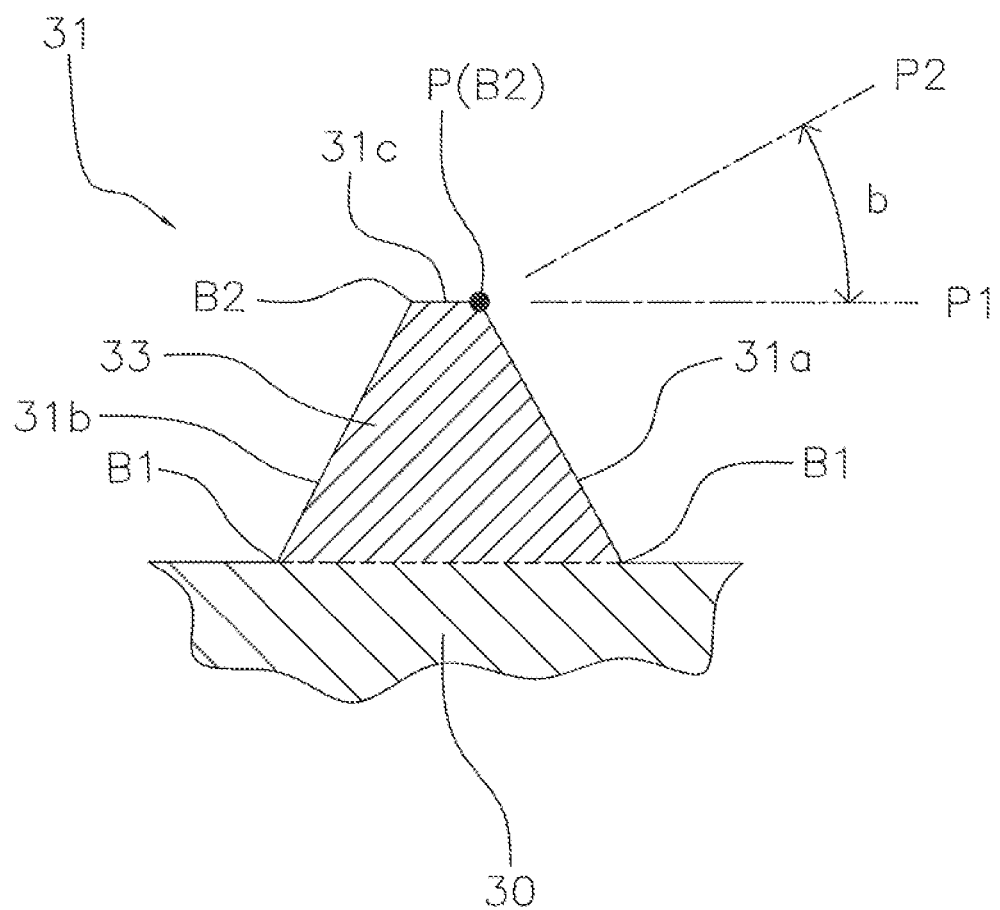
FIG. 7 is a cross-sectional view taken along the planar surface C passing through the meshing end point P of FIG. 6A.

Here, as shown in FIG. 7, on the cross section of the gear tooth 31 cut by the planar surface C (See FIG. 6), the meshing pressure angle b is an angle formed by a surface P1 which passes through the meshing end point P and is parallel to the disc portion 30 and a surface P2 (a normal line perpendicular to the line indicating the first side surface 31a in FIG. 7) which is perpendicular to the first side surface 31a at the meshing end point P.

As shown in FIG. 6B, a first angle a11 is larger than the meshing pressure angle b (See FIG. 7). The first angle a11 is the angle formed by a cylindrical surface CP1 around the rotational axis X2 and the third edge B3 when each gear tooth 31 is viewed from the outside in the circumferential direction R1 (see FIG. 5). Additionally, the first angle a11 is larger than a second angle a21. The second angle a21 is an angle formed by a cylindrical surface CP2 around the rotational axis X2 and the fourth edge B4. The cylindrical surfaces CP1, CP2 pass through the second edge B2 (the tooth tip surface of the body part 32).

FIG. 6C is a cross section of each gear tooth 31 cut by a surface which includes the second edge B2 of the tooth tip surface 31c on the first side surface 31a side and extends in the axial direction (See the cutting line VIC in FIG. 5). This surface (See the cutting line VIC in FIG. 5) can be construed as a surface which includes the second edge B2 of the tooth tip surface 31c and is perpendicular to the disc portion 30. When the second edge B2 is a straight line, this surface (See the cutting line VIC in FIG. 5) is a planar surface. When the second edge B2 is a curved line, this surface (See the cutting line VIC in FIG. 5) is a curved surface.

Also in the cross section of FIG. 6C, a first angle a12 is larger than the meshing pressure angle b (See FIG. 7). The first angle a12 is an angle formed by the cylindrical surface CP1 around the rotational axis X2 and the radially-inner surface 31d of the extended part 33. Additionally, the first angle a12 is larger than a second angle a22. The second angle a22 is an angle formed by the cylindrical surface CP2 around the rotational axis X2 and the radially-outer surface 31e of the body part 32. The cylindrical surfaces CP1, CP2 pass through the tooth tip surface 31c (the second edge B2) of the body part 32.

Additionally, as shown in FIGS. 6A and 6B, the first edge B1 of the first side surface 31a is longer than the second edge B2 of the first side surface 31a. For example, the ratio of the first edge B1 of the first side surface 31a to the second edge B2 of the first side surface 31a is 1.28 or more. Specifically, the ratio of the first edge B1 of the first side surface 31a to the second edge B2 of the first side surface 31a is preferably 1.28 or more and "1.50 or less."

Similarly, the first edge B1 of the second side surface 31b is longer than the second edge B2 of the second side surface 31b. For example, the ratio of the first edge B1 of the second side surface 31b to the second edge B2 of the second side surface 31b is 1.28 or more. Specifically, the ratio of the first edge B1 of the second side surface 31b to the second edge B2 of the second side surface 31b is preferably 1.28 or more and "1.50 or less."

Also, as shown in FIGS. 6A and 6B, the third edge B3 of the first side surface 31a is longer than the fourth edge B4 of the first side surface 31a. For example, the ratio of the third edge B3 of the first side surface 31a to the fourth edge B4 of the first side surface 31a is 1.10 or more. Specifically, the ratio of the third edge B3 of the first side surface 31a to the fourth edge B4 of the first side surface 31a is preferably 1.10 or more and "1.50 or less."

Similarly, the third edge B3 of the second side surface 31b is longer than the fourth edge B4 of the second side surface 31b. For example, the ratio of the third edge B3 of the second side surface 31b to the fourth edge B4 of the second side surface 31b is 1.10 or more. Specifically, the ratio of the third edge B3 of the second side surface 31b to the fourth edge B4 of the second side surface 31b is preferably 1.10 or more and "1.50 or less."

With the above-described drive gear 11 of the spinning reel 100, in each gear tooth 31, the extended part 33 extends radially inward from the body part 32. Here, the first angles a11, a12 are larger than the meshing pressure angle b. Meanwhile, in the conventional technology, only a body part 32 is formed on each gear tooth 31 without an extended part 33 being formed.

In this way, by forming the extended part 33 on each gear tooth 31 and making the first angles a11, a12 larger than the meshing pressure angle b, the stress generated at the corner sections on the inner peripheral side of the tooth tips of each gear tooth 31, for example, the stress generated at the corner sections having the first angles a11, a12, can be smaller than that of the conventional technology.

In this way, the rotational sensation of the drive gear 11 can be improved. Additionally, by improving the rotational sensation of the drive gear, the occurrence of abnormal noise that is generated when the drive gear 11 rotates can be suppressed.

Also, in the drive gear 11, the first angles a11, a12 are larger than the second angles a21, a22. As such, it is possible to suitably improve the rotational sensation of the drive gear 11. Additionally, it is possible to suitably suppress the occurrence of abnormal noise that is generated when the drive gear 11 rotates.

Additionally, in the drive gear 11, the first edges B1 are longer than the second edges B2. In detail, in the drive gear 11, the ratio of the first edges B1 to the second edges B2 is 1.28 or more. In this way, it is possible to suppress the deformation of each gear tooth 31. As such, it is possible to suitably improve the rotational sensation of the drive gear 11. Also, it is possible to suitably suppress the occurrence of abnormal noise that is generated when the drive gear 11 rotates.

Furthermore, in the drive gear 11, the third edges B3 are longer than the fourth edges B4. In one embodiment, in the drive gear 11, the ratio of the third edges B3 to the fourth edges B4 is 1.10 or more. In this way, it is possible to suppress the deformation of each gear tooth 31. As such, it is possible to suitably improve the rotational sensation of the drive gear 11. Also, it is possible to suitably suppress the occurrence of abnormal noise that is generated when the drive gear 11 rotates.

Other Embodiments

Although one embodiment of the present invention is descried above, the present invention is not limited to the above embodiment. Instead, various modifications can be made without departing from the gist of the invention. Particularly, a plurality of the embodiments and modified examples described in the present specification can be arbitrarily combined as needed.

The drive gear 11 in the above embodiment can be formed by die forming, machine processing, or press working.

In the above embodiment, the spinning reel 100 has been used as the fishing reel to explain, however, the present invention can be applied to other fishing reels.

Figure 8A:
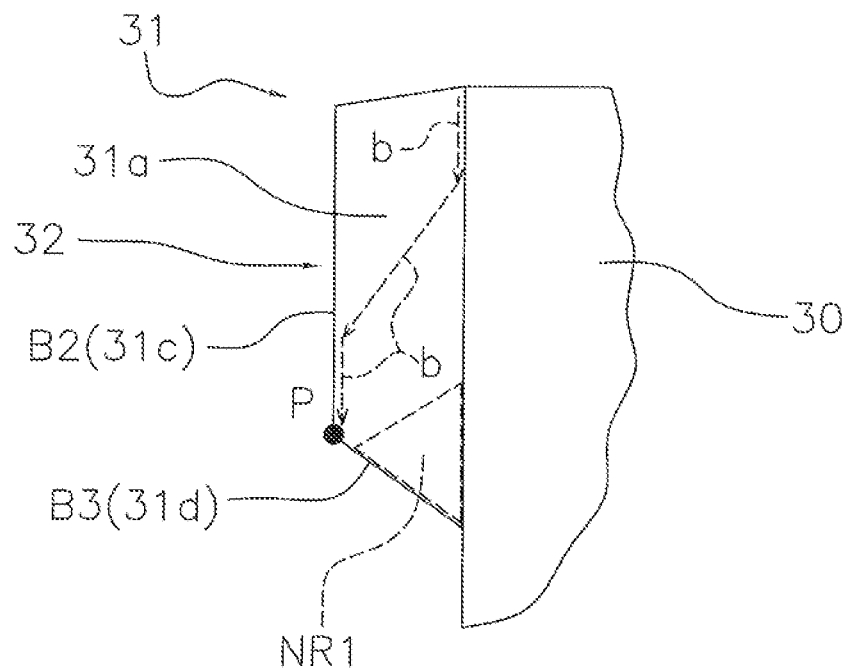
FIG. 8A is a side view showing a region which is not used for meshing on the gear tooth of the drive gear.

In the above embodiment, an example is shown, in which a meshing end point P is the intersection of the second edge B2 and the third edge B3. In this embodiment, as shown in FIG. 8A, for example, the region NR1 (the region shown by broken lines) which is not used for meshing is formed on the first side surface 31a, excluding the intersection of the second edge B2 and the third edge B3.

Figure 8B:
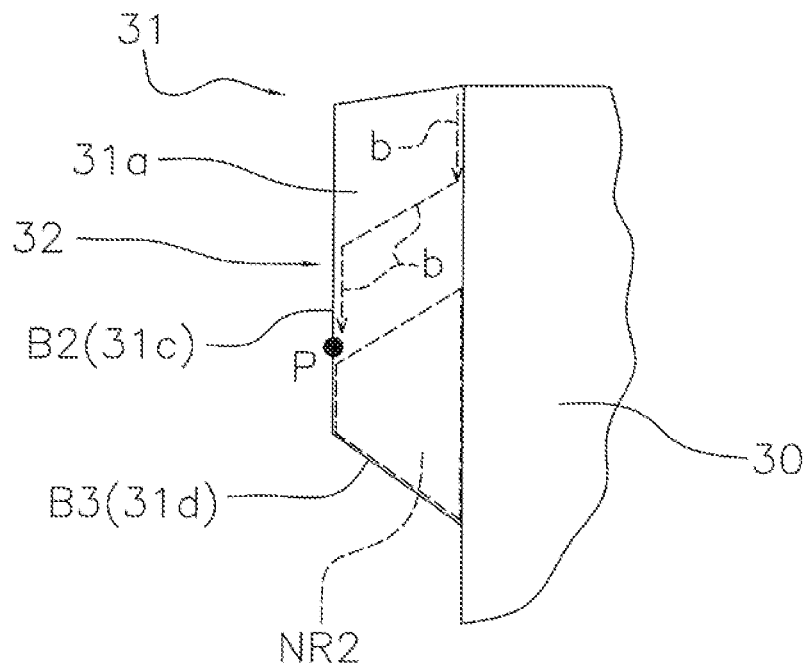
FIG. 8B is a side view showing a region which is not used for meshing on a gear tooth of a drive gear in another embodiment.
Figure 9:
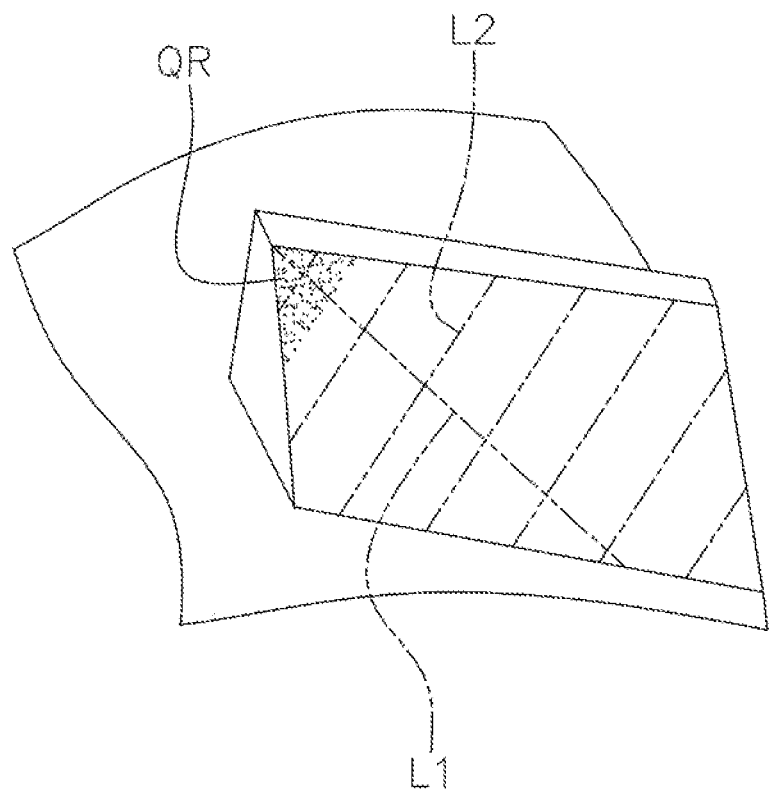
FIG. 9 is a reference drawing for explaining the conventional technology.

On the other hand, as shown in FIG. 8B, the region NR2 (the region shown by broken lines) which is not used for meshing can be formed on the first side surface 31a, including the intersection of the second edge B2 and the third edge B3. In this embodiment, the meshing end point P is formed on the second edge B2, excluding the intersection of the second edge B2 and the third edge B3.

As such, the meshing end point P is disposed on the second edge B2 at a position apart from the regions NR1, NR2 (the regions shown by broken lines) which are not used for meshing. Even with this configuration, the gear teeth 31 are formed so that the relationship between the first angles a11, a12, the second angles a21, a22 and the meshing pressure angle b is the same as in the above-mentioned embodiment.

What is claimed is:
1. A drive gear used for a fishing reel comprising:
 a disc portion having a rotational axis; and
 a gear tooth protruding from a side surface on an outer peripheral side of the disc portion in a direction in which the rotational axis extends,
 the gear tooth having a body part and an extended part extending radially inward from the body part, and
 a first angle formed by a cylindrical surface of the drive gear around the rotational axis passing through an axially-outer surface of the body part and a radially-inner surface of the extended part being larger than a meshing pressure angle.
2. The drive gear for a fishing reel according to claim 1, wherein
 the first angle is larger than a second angle formed by the cylindrical surface and the axially-outer surface of the body part.
3. The drive gear for a fishing reel according to claim 1, wherein
 a pair of tooth surfaces are formed on the body part and the extended part and are spaced apart in a circumferential direction;
 each tooth surface of the pair of tooth surfaces includes a first edge extending in a tooth trace direction on a base end side of the gear tooth and a second edge extending in the tooth trace direction on a tip side of the gear tooth; and
 the first edge of each tooth surface of the pair of tooth surfaces is longer than a respective second edge.
4. The drive gear for a fishing reel according to claim 3, wherein
 the ratio of the first edge of each tooth surface of the pair of tooth surfaces to the respective second edge is 1.28 or more.
5. The drive gear for a fishing reel according to claim 3, wherein
 each tooth surface of the pair of tooth surfaces further includes a third edge connecting a respective first edge and a respective second edge on a radially inner side of the gear tooth and a fourth edge connecting the respective first edge and the respective second edge on a radially outer side of the gear tooth; and
 the third edge of each tooth surface of the pair of tooth surfaces is longer than a respective fourth edge.
6. The drive gear for a fishing reel according to claim 5, wherein
 the ratio of the third edge of each tooth surface of the pair of tooth surfaces to the respective fourth edge is 1.10 or more.
7. The drive gear according to any one of claim 1, further comprising
 a reel main body,
 a handle rotatably supported by the reel body, and
 the drive gear is configured to be rotated by rotation of the handle.

\* \* \* \* \*